United States Patent [19]
Liebetreu et al.

[11] Patent Number: 5,721,756
[45] Date of Patent: Feb. 24, 1998

[54] DIGITAL RECEIVER WITH TUNABLE ANALOG PARAMETERS AND METHOD THEREFOR

[75] Inventors: John Michael Liebetreu, Scottsdale; Eric Martin Brombaugh, Mesa; Ronald Duane McCallister; James J. Crawford, both of Scottsdale, all of Ariz.

[73] Assignee: Sicom, Inc., Scottsdale, Ariz.

[21] Appl. No.: 620,671

[22] Filed: Mar. 26, 1996

[51] Int. Cl.⁶ .................................................. H04L 27/06
[52] U.S. Cl. ........................ 375/344; 375/350; 364/315
[58] Field of Search ............................. 375/344, 232, 375/350; 455/92.1, 230, 266; 329/325, 327, 363; 364/180, 724.01

[56] References Cited

U.S. PATENT DOCUMENTS

| | | | |
|---|---|---|---|
| 4,691,377 | 9/1987 | Yoshihara et al. | 375/344 |
| 4,856,027 | 8/1989 | Nakamura et al. | 375/81 |
| 4,896,336 | 1/1990 | Henely et al. | 375/344 |
| 5,048,058 | 9/1991 | Kaleh | 375/47 |
| 5,311,546 | 5/1994 | Paik et al. | 375/344 |
| 5,406,587 | 4/1995 | Horwitz et al. | 375/344 |
| 5,423,085 | 6/1995 | Lim | 375/344 |
| 5,455,536 | 10/1995 | Kono et al. | 375/344 |
| 5,487,186 | 1/1996 | Scarpa | 375/344 |
| 5,491,725 | 2/1996 | White | 375/344 |

OTHER PUBLICATIONS

Stanford Telecom ASIC & Custom Products Catalog, Eighth Edition,—cover sheet and pp. 55–67.

*Primary Examiner*—Stephen Chin
*Assistant Examiner*—Joseph Roundtree
*Attorney, Agent, or Firm*—Meschkow & Gresham, P.L.C.

[57] ABSTRACT

A digital data receiver includes tunable analog components having variable parameters that are responsive to the bit error rate (BER) of the decoded digital data. The analog components include a quadrature generator having a tunable phase shifter, an analog filter having a tunable bandwidth, a tunable magnitude equalizer circuit, a tunable group delay equalizer circuit, and an amplifier having an adjustable gain. The tunable components are controlled by tuning control signals that incorporate digitally-produced fine tuning signals. The digital tuning signals are altered in accordance with realtime changes in the BER.

18 Claims, 3 Drawing Sheets

DIGITAL RECEIVER WITH TUNABLE ANALOG PARAMETERS AND METHOD THEREFOR

FIELD OF THE INVENTION

The present invention relates generally to data communication systems. More specifically, the present invention relates to digital receivers having analog conditioning circuits.

BACKGROUND OF THE INVENTION

A digital data receiver often includes an analog conditioning section that conditions an input signal after it has been down-converted to a baseband or intermediate frequency. The analog conditioning section may, for example, include filters that remove noise and unwanted frequency components from the down-converted signal to prepare the signal for digitizing. In addition, the analog conditioning section may include one or more equalizer circuits that compensate for signal distortion caused by other components in the receiver. In a conventional digital receiver, the analog conditioning section includes components having fixed electronic parameters, e.g., filter bandwidth, amplifier gain, and quadrature phase shift. These fixed parameters are typically set to accommodate the anticipated baud rate of the incoming signal and to optimize the signal quality and the quality of the decoded data.

A variety of sources in a digital receiver can contribute to an unacceptable bit error rate (BER) resulting from excessive intersymbol interference (ISI) or adjacent channel interference (ACI). To minimize the BER (or other signal quality indicator) in some applications, it may be necessary to maintain control over one or more of the error sources. Unfortunately, conventional analog components with fixed parameters are not responsive to fluctuations in the BER or other signal quality indicators.

A digital receiver may employ tunable analog components to improve the quality of the decoded signal. However, the functional accuracy of conventional tunable analog components is, at best, only about 10%. Although such accuracy may be sufficient to enable the digital receiver to gain symbol synchronization, the receiver may still produce an unacceptable BER. To improve performance from a BER standpoint, a digital receiver may incorporate digital processing components rather than the analog conditioning components. Although the use of digital processing components improves the performance of the receiver, the digital components cost much more than their analog equivalents. Furthermore, digital components require more operating power than analog components. Thus, it may be impractical to increase the number of digital components utilized for signal conditioning.

The operating characteristics of analog components can drift in response to changes in operating temperatures, variations in assembly techniques, the age of the electronic components, and component tolerances. In a digital receiver that utilizes a quadrature demodulator, the analog components that condition the in-phase portion of the signal may not be adequately matched with the analog components that condition the quadrature portion of the signal. Although the stability of analog circuits may be improved by utilizing expensive components with tight tolerances or by maintaining strict manufacturing guidelines, these solutions may not be economically practical.

SUMMARY OF THE INVENTION

Accordingly, it is an advantage of the present invention that an improved digital data receiver is provided.

Another advantage of the present invention is that a digital data receiver is provided that includes a tunable analog conditioning circuit.

A further advantage is that a variety of analog parameters of the tunable analog circuit are responsive to a signal quality indicator obtained from the decoded data.

Another advantage is that the present invention provides a digital data receiver that adjusts a variety of analog components utilizing digital control signals.

Another advantage is that the digital data receiver may be realized with inexpensive components having broad electronic tolerances.

A further advantage is that analog components in an in-phase section of the digital data receiver are tuned to match corresponding analog components in a quadrature section of the receiver.

The above and other advantages of the present invention are carried out in one form by a digital data receiver that processes a received data communication signal. The receiver includes a tunable analog component having a variable parameter responsive to a tuning control signal. The receiver also includes means for monitoring a signal quality indicator associated with the received data communication signal and means for generating the tuning control signal in response to the monitored signal quality indicator. The tuning control signal varies in response to changes in the signal quality indicator.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
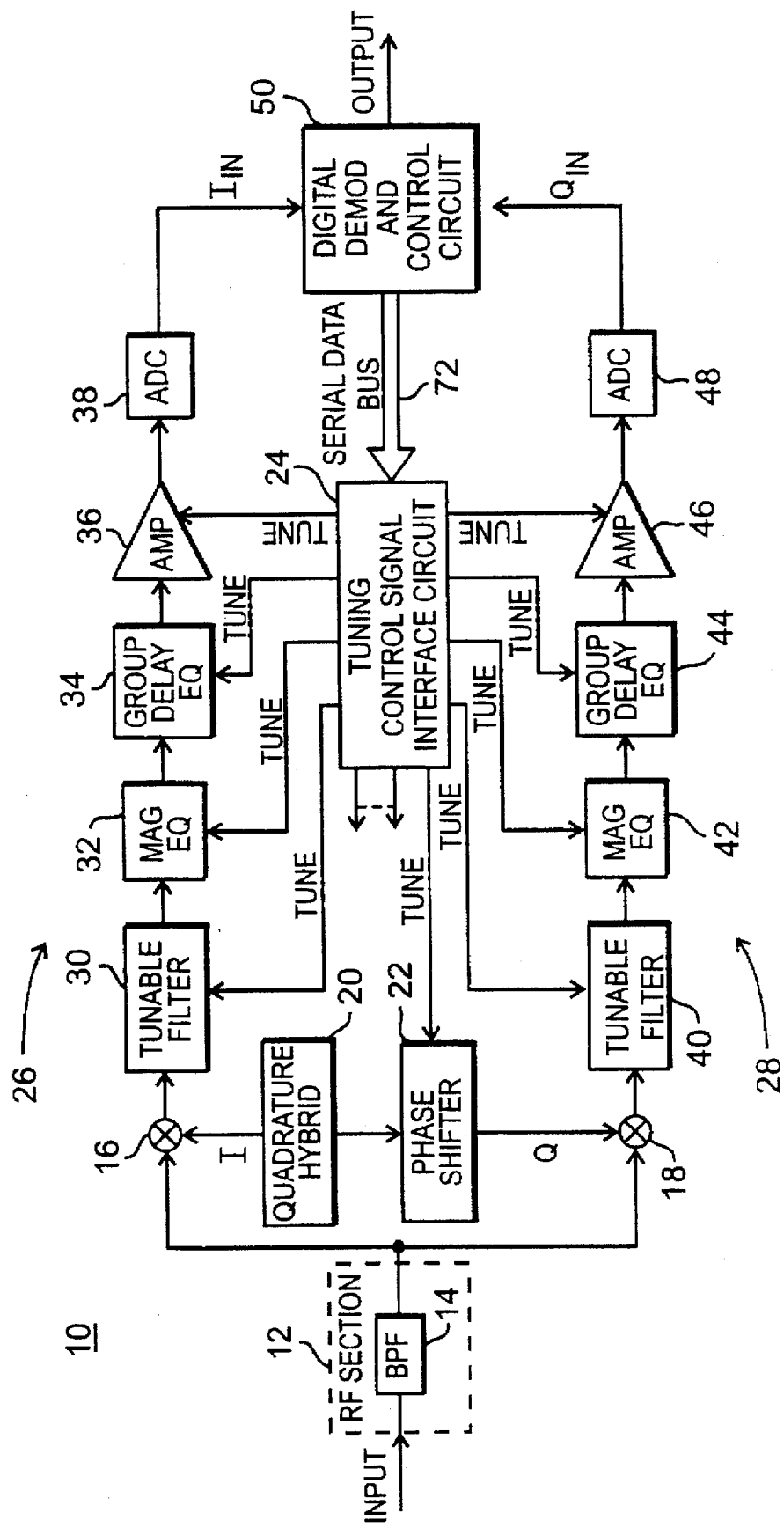
FIG. 1 is a schematic representation of a data communications receiver.

FIG. 1 is a schematic representation of a data communications receiver 10 configured in accordance with the preferred embodiment of the present invention. Receiver 10 receives and processes an analog carrier signal configured to convey digital data at a predetermined baud rate. The analog signal may, for example, be encoded via QPSK modulation. However, receiver 10 may be alternatively configured to receive and process signals generated by other digital modulation schemes. Conventional components typically implemented in digital receivers may not be shown or described herein. For example, although not shown, receiver 10 can include analog and/or digital phase locked loop circuits that facilitate signal acquisition and synchronization.

The modulated analog input signal enters an RF section 12 shortly after being received. RF section 12 includes at least an analog bandpass filter (BPF) 14. RF section 12 may also include additional filtering circuits, attenuators, buffers, and/or other conventional RF components configured to condition the analog carrier signal. RF section 12 may also down-convert the filtered signal to an intermediate frequency in accordance with known techniques. Due to practical limitations of BPF 14, magnitude distortion and/or group delay distortion (discussed below) may be introduced into the filtered carrier signal. The output of RF section 12 couples to a first mixer 16 and a second mixer 18.

A quadrature hybrid circuit 20 generates in-phase (I) and quadrature (Q) reference signals at, for example, a baseband frequency. Quadrature hybrid 20 may include or be coupled to a local oscillator or other frequency reference (not shown) that generates the baseband frequency. The I and Q reference signals serve as inputs to first mixer 16 and second mixer respectively.

In the preferred embodiment, a tunable phase shifter 22 adjusts the phase of the Q reference signal to vary the relative phase between the I and Q reference signals. Phase shifter 22 is controlled by a tuning control signal (labeled TUNE) obtained from a tuning interface circuit 24, which is described in detail below. Ideally, the Q reference signal should be 90 degrees out of phase relative to the I reference signal. Variations in this phase relationship can cause signal distortion and quadrature phase error between the I and Q components of the received signal. Quadrature phase errors are correlated from symbol to symbol, and correlated errors are undesirable in many practical digital decoding applications. Although typical quadrature circuits can be accurate to within two or three degrees, they may not be stable enough to produce an acceptable bit error rate (BER) in the decoded signal.

Nothing requires phase shifter 22 to be devoted to the Q reference signal, and receiver 10 may include an additional phase shifter (not shown) configured to adjust the phase of the I reference signal. Although quadrature hybrid 20 and phase shifter 22 are depicted as discrete components, they may be combined together in a quadrature signal generator circuit.

Mixers 16 and 18 down-convert the analog input signal into respective I and Q signal components. Receiver 10 conditions the I signal component in a first analog circuit branch 26 and conditions the Q signal component in a second analog circuit branch 28. In the preferred embodiment, first and second circuit branches 26 and 28 include matched analog components. As such, the following description of the components in first circuit branch 26 also applies to the corresponding components in second circuit branch 28.

The output of first mixer 16 couples to a first tunable analog filter 30. In the preferred embodiment, first analog filter 30 is a Nyquist filter having a variable bandwidth. Of course, those skilled in the art will recognize that the present invention may operate equivalently utilizing alternative filter configurations. The bandwidth of first analog filter 30 is adjusted in response to a tuning control signal obtained from tuning interface circuit 24. Receiver 10 regulates the bandwidth of first analog filter 30 to reduce unwanted noise in the encoded data signal. Such noise may include intersymbol interference (ISI), adjacent channel interference (ACI), and/or additive Gaussian noise (AWGN).

Figure 2:
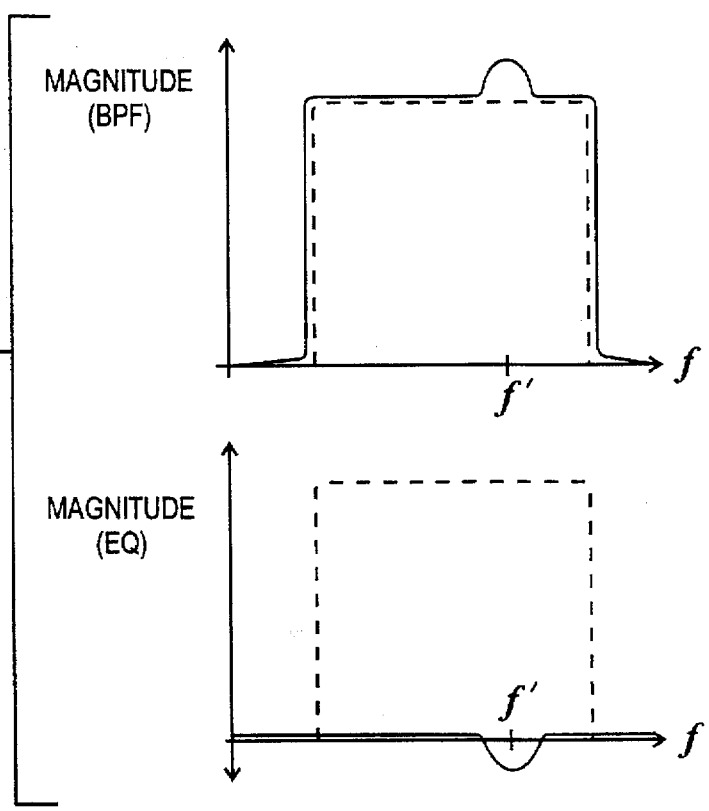
FIG. 2 shows graphical representations of the magnitude distortion caused by an exemplary analog bandpass filter and the corresponding correction introduced by a magnitude equalizer circuit.

The output of first analog filter 30 is coupled to a first magnitude equalizer circuit (magnitude EQ) 32. First magnitude EQ 32 is configured to compensate for magnitude distortion caused by BPF 14. First magnitude EQ 32 responds to at least one tuning control signal obtained from tuning interface circuit With reference to FIG. 2., a graphical representation of the magnitude distortion caused by an exemplary BPF 14 is shown. The ideal filter response of BPF 14 is shown as a dotted line, and the actual filter response is shown having magnitude distortion at frequency f'. FIG. 2 also includes a graphical representation of the corresponding correction introduced by first magnitude EQ 32. The amplitude of the magnitude compensation and the equalization frequency are independently adjustable, which enables receiver 10 to fine tune first magnitude EQ 32. If necessary, receiver 10 can include one or more additional magnitude EQs in series with first magnitude EQ 32 to compensate for magnitude distortion present at more than one frequency.

Figure 3:
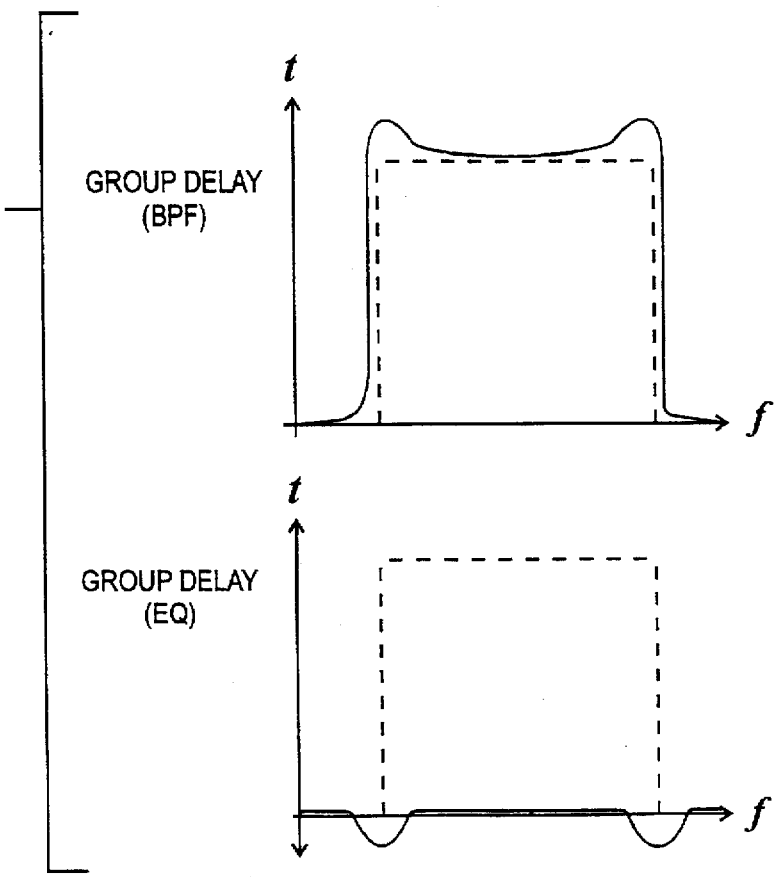
FIG. 3 shows graphical representations of the group delay caused by an exemplary analog bandpass filter and the corresponding correction introduced by a group delay equalizer circuit.

The output of first magnitude EQ 32 is coupled to a first group delay equalizer circuit (delay EQ) 34. First delay EQ 34 is configured to compensate for group delay caused by BPF 14. In practice, first delay EQ 34 is preferably a transconductance multiplier device that functions similar to an all pass filter. First delay EQ 34 receives at least one tuning control signal from tuning interface circuit 24. With reference to FIG. 3., a graphical representation of the group delay caused by an exemplary BPF 14 is shown. The ideal filter response of BPF 14 is shown as a dotted line, and group delay is shown near the ideal cutoff frequencies of BPF 14. Group delay near the ideal cutoff frequencies can introduce ISI and increase the BER of the decoded data. FIG. 3 also includes a graphical representation of the corresponding group delay compensation introduced by first delay EQ 34. The amount of group delay compensation and the equalization frequencies are preferably independently adjustable, which enables receiver 10 to fine tune first delay EQ 34. If necessary, receiver 10 can include one or more additional delay EQs in series with first delay EQ 34 to compensate for group delay present at other frequencies.

The output of first delay EQ 34 is coupled to a first amplifier circuit (amp) 36 having a variable gain. First amp 36 amplifies the I signal component using known techniques. First amp 36 is responsive to a tuning control signal generated by tuning interface circuit 24. The tuning control signal is configured to adjust the gain of first amp 36.

The output of first amp 36 is fed to a first analog-to-digital converter (ADC) 38. First ADC 38 is configured to sample the I signal component at approximately a symbol clock rate or at an integral multiple thereof. Although not shown, receiver 10 may include conventional clock generation circuits that produce the symbol clock signal. First ADC 38 quantizes the analog I signal component according to conventional digital conversion methodologies.

In the preferred embodiment, the gain of first amp 36 is varied to adjust a loading factor of first ADC 38. For example, if the input voltage to first ADC 38 is excessively high, then first ADC 38 may become saturated and produce saturation noise. On the other hand, if the input voltage is too low, then quantization noise can be introduced if the quantization range of first ADC 38 is insufficiently low.

Prior art loading schemes for ADCs are typically based upon statistical saturation data. For example, the frequency of saturation for different loading voltages may be monitored and a suitable gain may be selected to minimize the saturation rate. In contrast, the preferred embodiment utilizes a feedback-controlled tuning signal that is responsive to fluctuations in the BER of the decoded data signal (described below).

Second analog circuit branch 28 preferably includes tunable analog components corresponding to the components described above for first analog circuit branch 26. Specifically, receiver 10 includes a second analog filter 40, a second magnitude EQ 42, a second group delay EQ 44, a second amp 46, and a second ADC 48.

Corresponding components in first and second circuit branches 26 and 28 can be tuned independently from one another or together as a matched pair. Matched tuning may be desirable during coarse tuning of receiver 10. Coarse tuning may be performed by receiver 10 to obtain quick symbol synchronization during initial power-up of receiver 10 or when receiver 10 needs to recover symbol or node synchronization. Independent tuning may be performed by receiver 10 to fine tune the analog components in small increments. Independent tuning may be desirable to compensate for manufacturing tolerances of the components, variable operating conditions in receiver 10, and other factors that can affect the performance of each individual component.

Those skilled in the art will recognize that receiver 10 may include more or less tunable analog components in first and second analog circuit branches 26 and 28. In addition, the specific configuration of the analog components need not be as shown and described herein.

The outputs of first and second ADCs 38 and 48 (respectively labeled $I_{IN}$ and $Q_{IN}$ in FIGS. 1 and 4) are coupled to a digital circuit 50. Depending upon the specific application, digital circuit 50 may be configured as one or more application specific integrated circuit (ASIC) chips. Digital circuit 50 includes a demodulation circuit (described below) that extracts the digitally encoded data from the and $Q_{IN}$ signals. Digital circuit 50 also generates digital control signals associated with the various tuning control signals described above. In the preferred embodiment, the digital control signals are configured as multiple-bit digital words.

Figure 4:
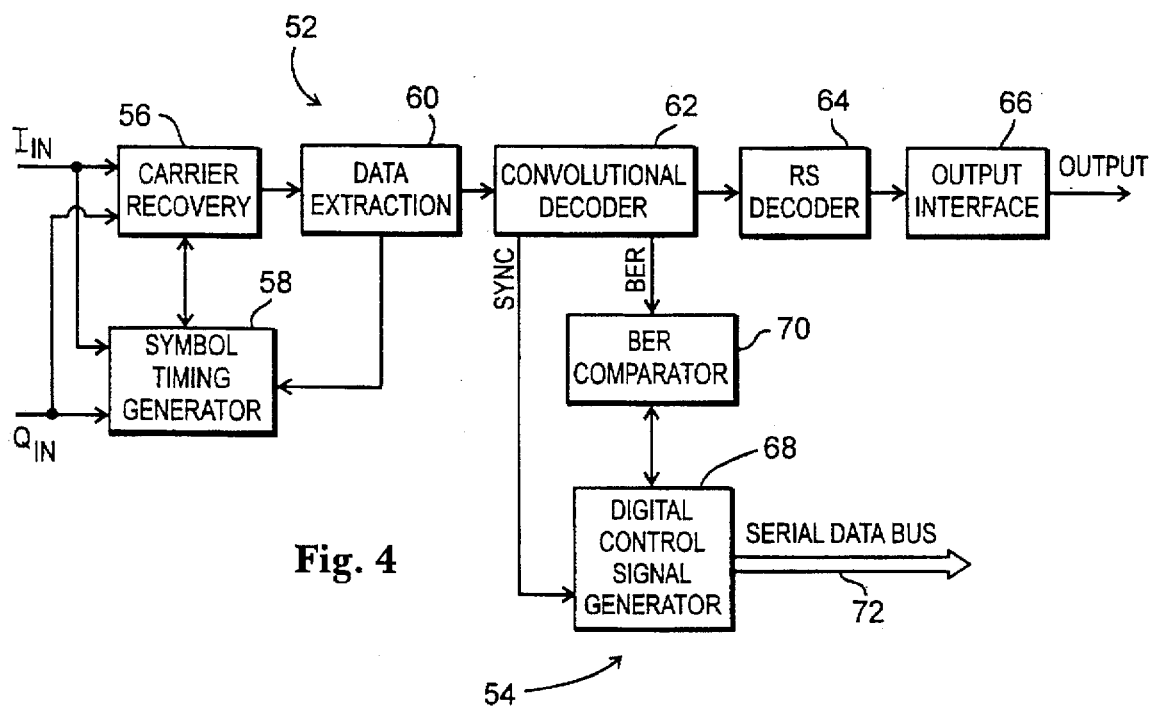
FIG. 4 is a schematic representation of a digital circuit utilized by the receiver.

FIG. 4 is a schematic representation of digital circuit 50. For the sake of clarity, conventional components are not shown or described herein. For example, digital circuit 50 may include a microprocessor, a digital signal processor (DSP), memory elements, or additional control circuits (not shown). As described above, digital circuit 50 includes a digital demodulation circuit 52 and a tuning control circuit 54. Demodulation circuit 52 extracts the digitally encoded data from the $I_{IN}$ and $Q_{IN}$ signals, and tuning control circuit 54 generates the digital words utilized in the various tuning signals.

Demodulation circuit 52 utilizes conventional demodulation and decoding techniques known to those skilled in the art. The $I_{IN}$ and $Q_{IN}$ signals serve as inputs to a carrier recovery circuit 56 and a symbol timing generator 58. Symbol timing generator 58 may receive the same clock signal that drives first and second ADCs 38 and 48 (see FIG. 1). Symbol timing generator 58 provides carrier recovery circuit 56 with a symbol synchronization signal, and carrier recovery circuit 56 may provide symbol timing generator 58 with a feedback control signal. A data extraction circuit 60 is coupled to the output of carrier recovery circuit 56. Data extraction circuit 60 extracts the encoded digital data from the carrier signal and may also provide symbol timing generator 58 with a feedback control signal.

The output of data extraction circuit 60 is coupled to a convolutional decoder 62. Convolutional decoders are well known to those skilled in the art and will not be described in detail herein. A Reed-Solomon (RS) decoder 64 is preferably cascaded with convolutional decoder 62. Cascading decoders in digital receivers is a known technique that produces an output signal having a relatively low BER. An output interface 66 receives the decoded data from RS decoder 64 and generates a corresponding digital output. The digital output is then routed according to system specifications.

Convolutional decoder 62 is preferably configured to produce a synchronization bit (labeled SYNC) and a bit error rate (BER) signal (labeled BER). The SYNC bit indicates when convolutional decoder 62 has acquired node synchronization with the coded input signal. The BER signal represents an estimation of the present BER of the decoded data. Convolutional decoder 62 may utilize known techniques to obtain the BER estimation. For example, convolutional decoder 62 may analyze a large number of individual bit errors and generate an average BER estimation for a given amount of data.

Convolutional decoder 62 is preferably a maximum-likelihood decoder circuit, such as a Viterbi decoder. Such decoder circuits operate under the assumption that individual symbol errors are uncorrelated, i.e., errors are independent from symbol to symbol. Errors in Viterbi decoders occur about once every 10,000 bits, while errors in a cascaded RS decoder occur about once every 10 billion bits. As such, receiver 10 obtains the BER estimation from convolutional decoder 62, which detects errors at a rate that allows BER-based feedback control of the various analog components. The use of BER estimations makes receiver 10 especially suited for nonmobile applications rather than for mobile applications that are designed to respond to rapid changes in operating conditions.

Although the preferred embodiment utilizes the BER to quantify the received signal quality, the present invention may monitor any suitable signal quality indicator to achieve equivalent results. For example, the present invention may monitor a node synchronization signal or a state metric processor update rate from convolutional decoder 62. Tuning control circuit 54 may alternatively monitor a signal from the RS decoder 64, such as a deinterleaver soft synchronization signal or a synchronization signal taken from the output of RS decoder 64. The preferred embodiment utilizes a re-encoded BER (i.e., channel symbol error rate), which is responsive to ISI, ACI, and AWGN (described above). Those skilled in the art will recognize that any measurement of errors in a periodically transmitted byte of digital information can be utilized equivalently by tuning control circuit 54.

The SYNC bit and the BER signal are utilized as inputs to tuning control circuit 54. Tuning control circuit 54 generates the digital words that serve as inputs to tuning interface circuit 24 (see FIG. 1). Tuning control circuit 54 is configured around a digital control signal generator 68. Control signal generator 68 may include discrete logic circuit components, a microprocessor, data registers, and/or memory elements (not shown). Briefly, control signal generator 68 generates the digital control words in response to the BER estimations. The digital control words may be incremented or decremented according to changes in the current BER. Control signal generator 68 is preferably configured to store and update tuning data for each of the tunable components utilized by receiver 10. Control signal generator 68 may also store historical tuning data that is utilized by receiver 10 to quickly acquire symbol and node synchronization with the input signal.

Control signal generator 68 is coupled to a BER comparator 70. BER comparator 70 obtains BER estimations from convolutional decoder 62 and determines the difference between a past BER estimation and a current BER estimation. Thus, BER comparator 70 may include memory elements, subtractor circuits, and other components (not shown). Control signal generator 68 and BER comparator 70 cooperate to fine tune receiver 10 such that bit errors are minimized. Of course, tuning control circuit 54 may employ different comparator circuits (not shown) configured to analyze alternative signal quality indicators.

Referring to FIG. 1, control signal generator 68 communicates with tuning interface circuit 24 via a data bus 72. Data bus 72 is preferably a serial data bus. The digital words generated by control signal generator 68 are received and processed by tuning interface circuit 24. Tuning interface circuit 24 may include demultiplexers, digital storage registers, digital-to-analog converters, and other conventional processing circuits (not shown). Depending upon the desired digital resolution of the digital-to-analog converters, the number of bits in the various digital tuning words may vary. Tuning interface circuit 24 processes the digital words, generates corresponding analog tuning control signals, and routes the analog tuning control signals to the various analog components described above.

In the preferred embodiment, each analog tuning control signal includes a coarse tuning component and a fine tuning component. The coarse tuning component can be generated by conventional analog processing techniques known to those skilled in the art. The fine tuning component is preferably associated with the digital control word generated by control signal generator 68. Receiver 10 may disable the fine tuning component to achieve initial signal acquisition or to reacquire symbol and node synchronization if receiver 10 becomes unsynchronized.

Figure 5:
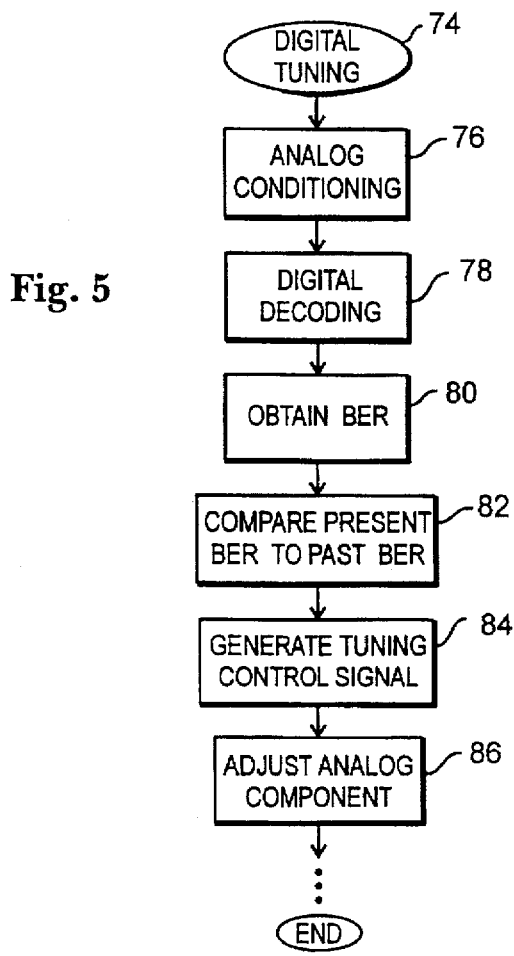
FIG. 5 is a flow diagram of a digital tuning process performed by the receiver.

With reference to FIG. 5, a digital tuning process 74 performed by receiver 10 is illustrated as a flow diagram. Process 74 is performed to adjust the tunable parameters of the analog components described above. To ensure that changes in the BER are due to adjustments of a particular component, process 74 may be performed for one component (or for one matched pair of components) while the tunable parameters for the remaining components remain fixed. In addition, process 74 may be periodically repeated for one or more components to ensure that receiver 10 is desirably tuned. If digitally controlled fine tuning is not required by receiver 10 (e.g., during initial signal acquisition or when receiver 10 is out of symbol or node synchronization), process 74 can be terminated or delayed.

Digital tuning process 74 begins with a task 76, which causes receiver 10 to condition the received data communication signal with the various analog circuit components. As described above, task 76 may condition I and Q signal components with first and second analog circuit branches 26 and 28, respectively (see FIG. 1). In addition to task 76, a task 78 causes receiver 10 to digitally decode the received signal. Task 78 is preferably performed by digital demodulation circuit 52 (see FIG. 4) to extract digital data from the received signal.

After task 78, a task 80 is performed to obtain a current BER estimation for the decoded signal. As described above, demodulation circuit 52 utilizes convolutional decoder 62, which also performs task 80. Task 80 may obtain the BER estimation using techniques known in the digital signal processing art. After the current BER estimation is obtained, a task 82 is initiated. Task 82 causes BER comparator 70 to compare the present BER estimation (obtained in task 80) to a past BER estimation. Task 82 may, for example, compare the present BER estimation to a BER estimation stored in a memory buffer. The past BER estimation may have been recorded prior to the last adjustment of the particular analog component.

Following task 82, a task 84 generates a tuning control signal in response to the BER estimations. For example, if the change in the BER is marginal or below a predetermined threshold, then task 84 may not alter the tuning control signal. On the other hand, if the BER improves or worsens by a certain amount, then task 84 may cause control signal generator 68 (see FIG. 4) to alter the digital control signal to compensate for the BER change. Specific algorithms and formulas for the generation of the tuning control signals can vary from application to application.

After task 84 generates the tuning control signal, a task 86 is performed to adjust the tunable parameter of the particular analog component. Following task 86, digital tuning process 74 ends. However, as discussed above, process 74 may be periodically repeated to allow receiver 10 to closely regulate the various tunable analog components. Thus, the analog components are feedback-controlled with digital signals generated in response to realtime changes in the BER of the decoded digital data signal.

In summary, the present invention provides an improved digital data receiver that includes a tunable analog conditioning circuit. A variety of tunable analog components are responsive to the bit error rate (BER) of the decoded digital data. The receiver utilizes digital control signals to adjust the various tunable analog components. In addition, the digital data receiver may be realized with relatively inexpensive analog components having broad electronic tolerances. The receiver can employ an in-phase analog circuit branch having analog components that are tuned to match corresponding analog components in a quadrature analog circuit branch.

The above description is of a preferred embodiment of the present invention, and the invention is not limited to the specific embodiment described and illustrated. For example, the various circuits have been simplified for the sake of clarity, and in practice they may include additional components or perform conventional operations not described herein. In addition, the characteristics and parameters of various analog components are used herein for illustrative purposes, and are not intended to limit the scope of the present invention. Furthermore, many variations and modifications will be evident to those skilled in this art, and such variations and modifications are intended to be included within the spirit and scope of the invention, as expressed in the following claims.

What is claimed is:

1. A method for processing a received data communication signal, said method comprising the steps of:

extracting encoded digital data from said received data communication signal;

digitally decoding said encoded digital data;

obtaining, in response to said digitally decoding step, a present signal quality indicator and a past signal quality indicator;

comparing said present signal quality indicator to said past signal quality indicator;

generating a digital control signal in response to said comparing step; and adjusting a tunable analog component in response to said digital control signal.

2. A method according to claim 1, wherein said present and past signal quality indicators are responsive to present and past bit error rates, respectively.

3. A method according to claim 1, wherein said digitally decoding step is performed using a maximum-likelihood digital decoder circuit.

4. A method according to claim 1, wherein:

said tunable analog component comprises a quadrature signal generator;

said received data communication signal includes an in-phase (I) component and a quadrature (Q) component; and said adjusting step adjusts said quadrature signal generator to vary relative phase between said I and Q components.

5. A method according to claim 1, wherein:

said received data communication signal includes an in-phase (I) component and a quadrature (Q) component;

said method further comprises the step of processing said I and Q components with a first analog circuit branch having a first tunable analog component and a second analog circuit branch having a second tunable analog component, respectively; and said adjusting step independently adjusts said first and second tunable analog components.

6. A method according to claim 1, wherein:

said tunable analog component comprises an analog filtering circuit having a variable bandwidth; and said adjusting step adjusts said bandwidth.

7. A method according to claim 1, further comprising the step of filtering said received data communication signal with an analog bandpass filter to produce a filtered data communication signal into which magnitude distortion has been introduced by said analog bandpass filter, wherein:

said tunable analog component comprises a magnitude equalizer circuit having adjustable magnitude and frequency parameters and being configured to equalize said filtered data communication signal to compensate for said magnitude distortion caused by said analog bandpass filter and to produce an equalized data communication signal;

said extracting step extracts said encoded digital data from said equalized data communication signal; and said adjusting step adjusts said magnitude and frequency parameters of said magnitude equalizer circuit.

8. A method according to claim 1, further comprising the step of filtering said received data communication signal with an analog bandpass filter to produce a filtered data communication signal into which group delay has been introduced by said analog bandpass filter, wherein:

said tunable analog component comprises a group delay equalizer circuit having adjustable group delay and frequency parameters and being configured to equalize said filtered data communication signal to compensate for said group delay caused by said analog bandpass filter and to produce an equalized data communication signal;

said extracting step extracts said encoded digital data from said equalized data communication signal; and said adjusting step adjusts said group delay and frequency parameters of said group delay equalizer circuit.

9. A method according to claim 1, wherein:

said tunable analog component comprises an amplifier circuit configured to amplify said received data communication signal; and said adjusting step adjusts a gain of said amplifier circuit.

10. A method according to claim 9, wherein:

said method additionally comprises the step of converting, prior to said extracting step, said received data communication signal from an analog signal into a digital signal using an analog-to-digital converter circuit which has a loading factor parameter; and said loading factor of said analog-to-digital converter circuit is responsive to said gain.

11. A method according to claim 1, wherein:

said adjusting step is performed for a plurality of tunable analog components; and said method further comprises the step of generating a plurality of tuning control signals utilized during said adjusting step, each of said tuning control signals being responsive to said comparing step.

12. A method according to claim 1, wherein said adjusting step is not performed unless said present signal quality indicator differs from said past signal quality indicator by at least a predetermined amount.

13. A method for processing a received data communication signal, said method comprising the steps of:

conditioning said received data communication signal with an analog circuit having at least one tunable analog component;

extracting encoded digital data from said received data communication signal;

digitally decoding said encoded digital data;

obtaining, in response to said digitally decoding step, a signal quality indicator responsive to a bit error rate, said bit error rate being generated by a maximum-likelihood digital decoder circuit; and regulating, in response to said signal quality indicator, said at least one tunable analog component.

14. A method for processing a received data communication signal, said method comprising the steps of:

conditioning said received data communication signal with an analog circuit having at least one tunable analog component;

extracting encoded digital data from said received data communication signal;

digitally decoding said encoded digital data;

obtaining, in response to said digitally decoding step, a signal quality indicator that is a present signal quality indicator;

comparing said present signal quality indicator to a past signal quality indicator;

generating at least one digital control signal in response to said comparing step; and regulating, in response to said signal quality indicator and said at least one digital control signal, said at least one tunable analog component.

15. A data communications receiver that processes a received data communication signal which includes an in-phase (I) component and a quadrature (Q) component, said receiver comprising:

data extraction means for extracting encoded digital data from said received data communication signal;

decoding means, coupled to said data extraction means, for digitally decoding said encoded digital data and generating a signal quality indicator;

means for generating a tuning control signal in response to said signal quality indicator, said means for generating being coupled to said decoding means; and a tunable analog component having a variable parameter responsive to said tuning control signal, said tunable analog component being coupled to said means for generating, wherein said tunable analog component comprises a quadrature signal generator having a variable phase shifter, and said tuning control signal is configured to adjust said phase shifter to vary relative phase between said I and Q components.

16. A data communications receiver that processes a received data communication signal, said receiver comprising:

data extraction means for extracting encoded digital data from said received data communication signal;

decoding means, coupled to said data extraction means, for digitally decoding said encoded digital data and generating a signal quality indicator;

means for generating a tuning control signal in response to said signal quality indicator, said means for generating being coupled to said decoding means; and a tunable analog component having a variable parameter responsive to said tuning control signal, said tunable analog component being coupled to said means for generating; and an analog bandpass filter configured to filter said received data communication signal and to produce a filtered data communication signal into which magnitude distortion has been introduced by said analog bandpass filter, wherein:

said tunable analog component comprises a magnitude equalizer circuit having adjustable magnitude and frequency parameters and being configured to equalize said filtered data communication signal to compensate for said magnitude distortion introduced by said analog bandpass filter and to produce an equalized data communication signal;

said data extraction means extracts said encoded digital data from said equalized data communication signal; and said tuning control signal is configured to adjust said magnitude and frequency parameters of said magnitude equalizer circuit.

17. A data communications receiver that processes a received data communication signal, said receiver comprising:

data extraction means for extracting encoded digital data from said received data communication signal;

decoding means, coupled to said data extraction means, for digitally decoding said encoded digital data and generating a signal quality indicator;

means for generating a tuning control signal in response to said signal quality indicator, said means for generating being coupled to said decoding means; and a tunable analog component having a variable parameter responsive to said tuning control signal, said tunable analog component being coupled to said means for generating; and an analog bandpass filter configured to filter said received data communication signal and to produce a filtered data communication signal into which group delay has been introduced by said analog bandpass filter, wherein:

said tunable analog component comprises a group delay equalizer circuit having adjustable group delay and frequency parameters and being configured to equalize said filtered data communication signal to compensate for said group delay introduced by said analog bandpass filter and to produce an equalized data communication signal; and said tuning control signal is configured to adjust group delay and frequency parameters of said group delay equalizer circuit.

18. A data communications receiver that processes a received data communication signal, said receiver comprising:

data extraction means for extracting encoded digital data from said received data communication signal;

decoding means, coupled to said data extraction means, for digitally decoding said encoded digital data and generating a signal quality indicator;

means for generating a tuning control signal in response to said signal quality indicator, said means for generating being coupled to said decoding means;

a tunable analog component, coupled to said means for generating, comprising an amplifier circuit configured to amplify said received data communication signal, said tunable analog component having a variable parameter responsive to said tuning control signal, and said tuning control signal being configured to adjust a gain of said amplifier circuit; and an analog-to-digital converter circuit coupled to said amplifier circuit and having a loading factor responsive to said gain.

\* \* \* \* \*